US011173699B2

(12) United States Patent
Stadlmann

(10) Patent No.: US 11,173,699 B2
(45) Date of Patent: Nov. 16, 2021

(54) STEREOLITHOGRAPHY APPARATUS COMPRISING A CARTRIDGE DEVICE

(71) Applicant: Klaus Stadlmann, Vienna (AT)

(72) Inventor: Klaus Stadlmann, Vienna (AT)

(*) Notice: Subject to any disclaimer, the term of this patent is extended or adjusted under 35 U.S.C. 154(b) by 618 days.

(21) Appl. No.: 15/775,488

(22) PCT Filed: Nov. 10, 2016

(86) PCT No.: PCT/AT2016/060104
§ 371 (c)(1),
(2) Date: Jun. 25, 2018

(87) PCT Pub. No.: WO2017/079774
PCT Pub. Date: May 18, 2017

(65) Prior Publication Data
US 2018/0370136 A1 Dec. 27, 2018

(30) Foreign Application Priority Data

Nov. 12, 2015 (AT) ................ A 50966/2015

(51) Int. Cl.
B33Y 30/00 (2015.01)
B29C 64/124 (2017.01)
(Continued)

(52) U.S. Cl.
CPC ............ *B33Y 40/00* (2014.12); *B29C 64/124* (2017.08); *B29C 64/245* (2017.08);
(Continued)

(58) Field of Classification Search
CPC ....................... B29C 64/124; B29C 64/259
See application file for complete search history.

(56) References Cited

U.S. PATENT DOCUMENTS 5,158,858 A * 10/1992 Lawton ............... B29C 64/135
264/401
7,438,846 B2 10/2008 John
(Continued)

FOREIGN PATENT DOCUMENTS

CN 204466799 U * 7/2015 ........... B29C 64/124
CN 204466799 U 7/2015
(Continued)

OTHER PUBLICATIONS

Machine Translation CN204466799U (Year: 2015).*
(Continued)

*Primary Examiner* — Matthew J Daniels
*Assistant Examiner* — Wayne K. Swier
(74) *Attorney, Agent, or Firm* — Eversheds Sutherland (US) LLP

(57) ABSTRACT

In a stereolithography device (1), a three-dimensional object (2) is generated by curing a photosensitive substance (3) under the action of specific radiation, wherein the device includes a support unit, a radiation source (8) for generating the radiation, and a cartridge unit (10) that can be positioned on the support unit and removed therefrom. The cartridge unit (10) includes an interior space (140) surrounded by a casing (14), wherein the casing of the cartridge unit is deformable and at least partially transparent to the radiation triggering the curing process. The interior space (140) surrounded by the casing has a volume including a receiving space (4) in which the photosensitive substance (3) is present for at least a duration of an irradiation and curing process and accessible to the radiation.

24 Claims, 10 Drawing Sheets

(51) Int. Cl.
  *B29C 64/321* (2017.01)
  *B29C 64/379* (2017.01)
  *B29C 64/259* (2017.01)
  *B29C 64/245* (2017.01)
  *B33Y 10/00* (2015.01)
  *B33Y 40/00* (2020.01)

(52) U.S. Cl.
  CPC .......... *B29C 64/259* (2017.08); *B29C 64/321* (2017.08); *B29C 64/379* (2017.08); *B33Y 30/00* (2014.12); *B33Y 10/00* (2014.12)

(56) References Cited

U.S. PATENT DOCUMENTS

| | | | | |
|---|---|---|---|---|
| 2002/0155189 | A1* | 10/2002 | John | B29C 64/129 |
| | | | | 425/174.4 |
| 2007/0257055 | A1* | 11/2007 | Scott | B33Y 40/00 |
| | | | | 222/71 |
| 2010/0035002 | A1* | 2/2010 | Veress | B82Y 40/00 |
| | | | | 428/35.5 |
| 2012/0195994 | A1* | 8/2012 | El-Siblani | B29C 64/124 |
| | | | | 425/174.4 |
| 2012/0321224 | A1* | 12/2012 | Zamski | B65D 31/12 |
| | | | | 383/38 |
| 2013/0075954 | A1* | 3/2013 | Gregory, II | G03F 7/0037 |
| | | | | 264/401 |
| 2013/0089642 | A1* | 4/2013 | Lipson | B29C 64/209 |
| | | | | 426/115 |
| 2014/0361463 | A1* | 12/2014 | DeSimone | B33Y 50/02 |
| | | | | 264/401 |
| 2015/0056320 | A1* | 2/2015 | Costabeber | B29C 64/124 |
| | | | | 425/169 |
| 2015/0097315 | A1* | 4/2015 | DeSimone | B33Y 50/02 |
| | | | | 264/401 |
| 2015/0224710 | A1* | 8/2015 | El-Siblani | B33Y 10/00 |
| | | | | 264/401 |
| 2016/0136902 | A1* | 5/2016 | Stadlmann | B29C 64/135 |
| | | | | 425/174.4 |
| 2016/0288421 | A1* | 10/2016 | Costabeber | B33Y 40/00 |

FOREIGN PATENT DOCUMENTS

| | | |
|---|---|---|
| DE | 102014215213 A1 | 4/2015 |
| JP | S63-236627 A | 10/1988 |
| JP | H05-96631 A | 4/1993 |
| JP | H06-246838 A | 9/1994 |
| WO | 2014/016668 A1 | 1/2014 |
| WO | 2014/126834 A2 | 8/2014 |
| WO | 2016/062739 A1 | 4/2016 |

OTHER PUBLICATIONS

Austrian Search Report issued in Application No. A 50966/2015, dated Aug. 1, 2016 (1 page).
International Search Report and Written Opinion for PCT/AT2016/060104, dated May 30, 2017 (17 pages).
Search Report for European Patent Application No. 20168709, dated Jul. 7, 2020 (11 pages).
CN Patent Application 201680078620.4, filed Nov. 10, 2016, First Office Action dated Nov. 20, 2019.
Extended Search Report for European Patent Application No. 20168709, dated Sep. 28, 2020 (12 pages).

\* cited by examiner

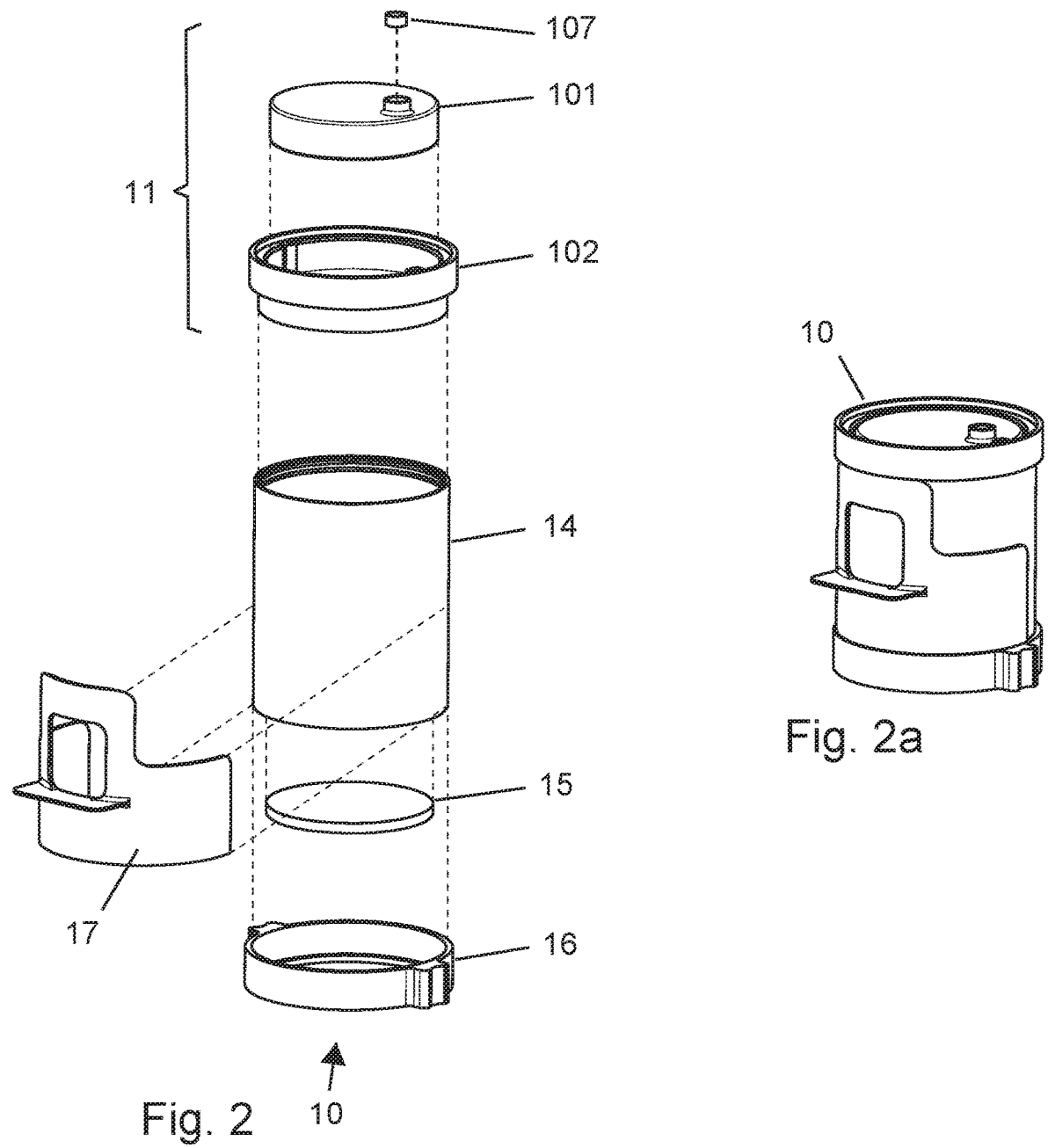

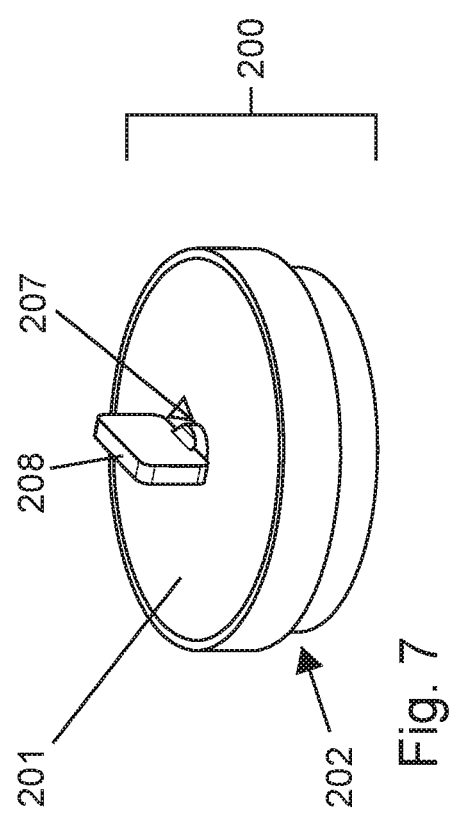
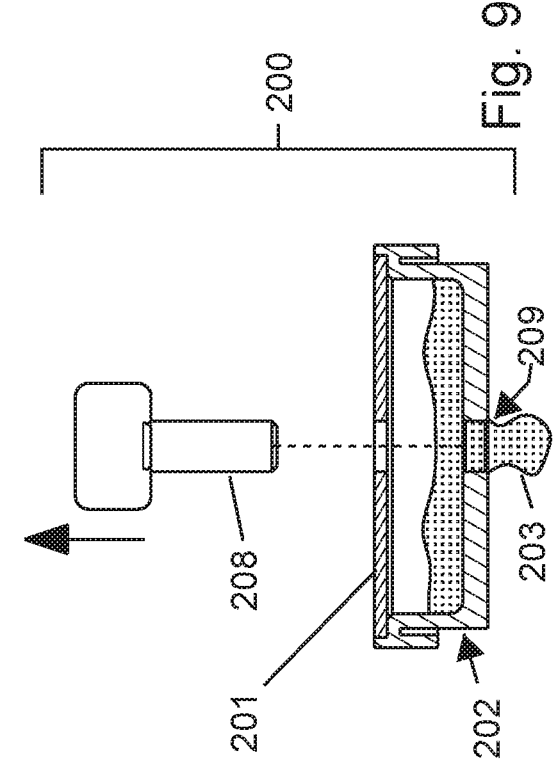
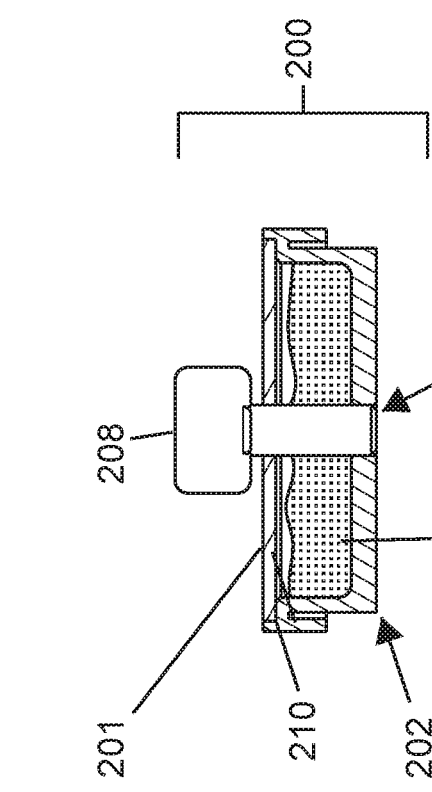

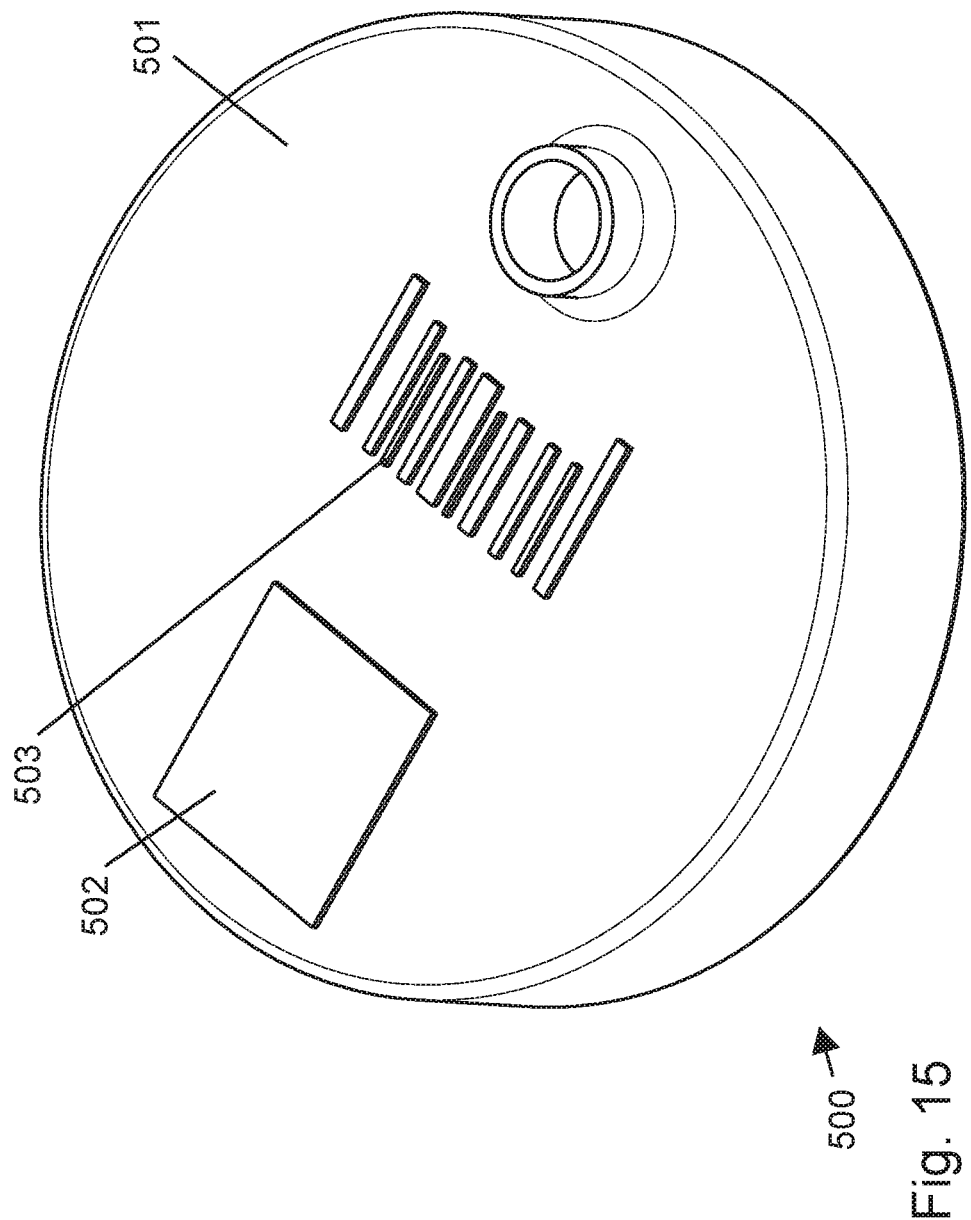

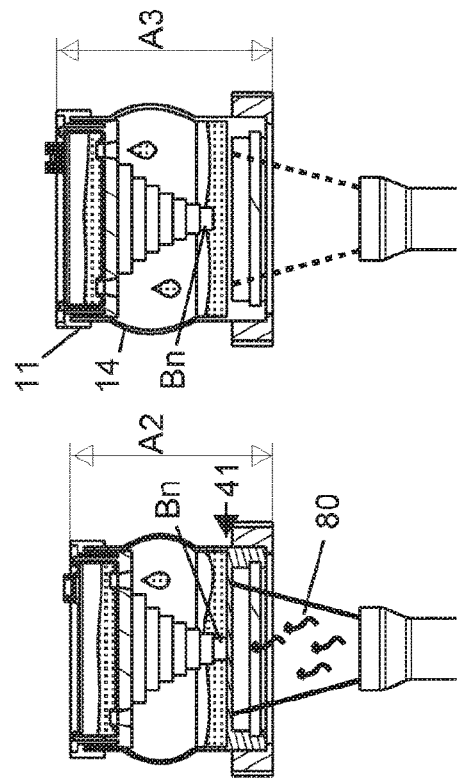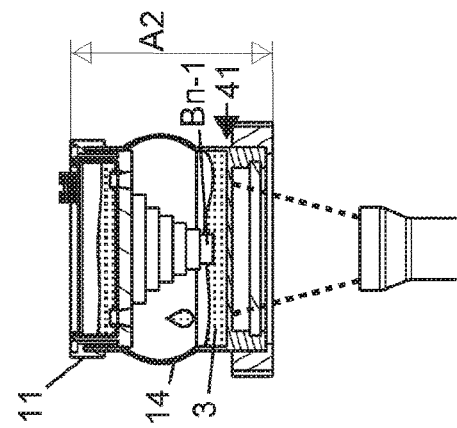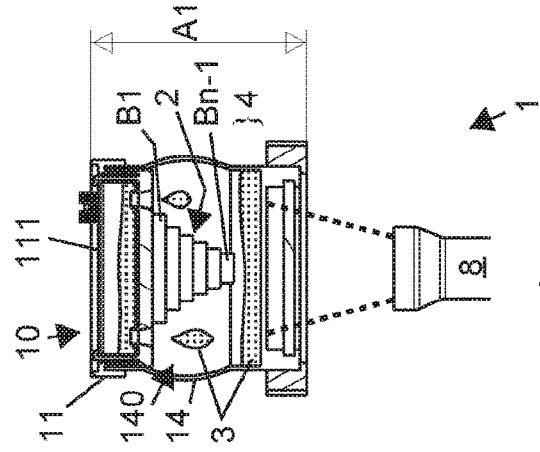

STEREOLITHOGRAPHY APPARATUS COMPRISING A CARTRIDGE DEVICE

The invention relates to a stereolithography device for producing a three-dimensional object by way of layered or continuous curing of a photosensitive substance under the action of specific radiation triggering the curing process, the device comprising:
- a support unit;
- a radiation source for generating the radiation triggering the curing process; and
- a cartridge unit that can be positioned on the support unit and removed therefrom.

Devices of this type are well-known. A stereolithography apparatus is used to create a three-dimensional body from a photosensitive substance by bonding layers or layer information in a layer by layer fashion or continuously. The invention is directed to the use of an improved cartridge system, which can be used in such an apparatus and surrounds the object to be produced.

The term stereolithography denotes a production process in which a light-sensitive substance that solidifies upon irradiation with light, and which in general is a liquid monomer formulation, is used to generate a three-dimensional body ("object") having a predefinable desired shape in a layer by layer fashion by generating geometric layer information, which can be generated, for example, by way of a digital mask or by a moving laser beam. The fundamental principle of stereolithography is also known by terms such as rapid prototyping, 3D printing and the like.

In addition to a controllable laser, pixel-based display units, incoherent light sources, for example in conjunction with controllable micromirrors (known as MEMS or DLP chips), may be used for the stereolithography process for projecting geometric layer information into a photosensitive substance, so as to cure ("develop") this substance in a layer by layer fashion or continuously on the bottom or another defined reference surface. The layer information may, in particular, be pixel-based. The reference surface (also referred to as reference plane) represents a defined surface area on which the curing of a layer of the photosensitive substance takes place; this may be the surface of the inside of the bottom or lid or another suitably defined surface area and, depending on the application, may have a suitable solid, flexible or liquid consistency. So as to separate the cured layer from the reference surface, this layer is first, which is to say prior to the first step of the generative process, transferred onto a support (for example, attached by way of a polymerization process), which is able to carry out a relative movement with respect to the focal plane, which may coincide with the upper face of the reference surface (for example the cartridge bottom). A next method step ensures that new material of the photosensitive substance is able to subsequently flow between the most recently generated layer and the reference surface; this may take place by way of a simple stroke movement, for example. The subsequent flow of photosensitive substance can then, in turn, be cured by way of exposure. These method steps are repeated until the object to be formed has been built according to the individual projected pieces of layer information.

The greatest problems of these methods lie primarily in the effective and variable storage or safekeeping of the photosensitive substance within the apparatus itself, as well as in the gentle separation of the individual layers from the reference surface, the effective control of the relative movement of the support of the generated layers or of the generated object with respect to the reference surface, and in handling of the apparatus and feeding of new photosensitive material into the apparatus in a manner that is as simple as possible.

A variety of approaches are described in the prior art, which usually provide open vat-shaped receptacles for the photosensitive substance. In addition, cartridges have been described; however, these represent very complex, rigid and cumbersome receptacles.

DE 10 2014 215 213 A1, for example, describes a receptacle in which a film joined to a bottom plate is provided, which is stretched downwardly by a non-transparent portion. This film may be deformed when the layers are lifted off so as to enable easier and gentler detachment. The receptacle is an assembled, complex assembly, which comprises, among other things, the bottom plate, a tensioning part protruding into the receptacle, and various other parts, such as the support itself, and has a complicated design.

Other approaches, such as in DE 101 19 817 A1 and JP H06 246 838 A, use an open, vat-shaped geometry instead of a closed cartridge, and likewise include a deformable film so as to reduce the peel-off forces.

The known approaches have the disadvantage that the design of the cartridge system and of the vats themselves is very complex, and furthermore have disadvantages regarding the handling of the photosensitive substance, such as cleaning the vat, inserting the vat in the apparatus, establishing a precise amount to be added, as well as the exposed liquid level in the case of vat systems, the hazard of making direct contact with the photosensitive substance and/or of contaminating the apparatus itself during replenishment or transfer. Considerable disadvantages also arise during the insertion of a vat filled with photosensitive material and/or during removal of the vat since complicated clamping mechanisms have to be actuated, or the vat has to be pushed into holding devices. The problem of contaminating the apparatus and/or the operator, in particular of contaminating individual apparatus components or component groups, also exists during the removal of the generated component, requiring cleaning when switching to a different photosensitive material, which is a cumbersome and time-consuming process. Another disadvantage is that conventional approaches do not allow the apparatus to be operated under a certain atmosphere or certain atmospheric conditions. Cleaning the generated object also represents a problem since, during the removal of the support of the object from the apparatus, uncured monomers wetting the object can contaminate the apparatus as well as the installation site of the apparatus, in addition to a possible contamination of the user. Due to the exposed liquid level, the photosensitive substance is subjected to a certain aging process, which changes the chemical properties, and thus adversely affects the properties of the created object, such as the required biocompatibility.

It is the object of the invention described herein to create a stereolithography device and a cartridge unit for such a device, which overcome the above-described disadvantages, and to achieve a simplified, trouble-free, economical, preferably continuous, and easy-to-document generation of three-dimensional objects.

This object is achieved by a stereolithography device of the type mentioned at the outset, in which the cartridge unit comprises an interior space surrounded by a casing, wherein at least a portion of the casing is at least partially transparent to the radiation triggering the curing process, wherein according to the invention the casing of the cartridge unit is deformable, and the interior space surrounded by the casing has a volume that is at least partially formed by a receiving space for the photosensitive substance. A "receiving space" shall be understood to mean the space in which a quantity of the photosensitive substance can be accommodated for at least a duration of an irradiation and curing process and is accessible to the radiation.

The above-described object is also achieved by a cartridge unit for use in a stereolithography device of the aforementioned type, wherein the cartridge unit includes an interior space surrounded by a casing, wherein the casing of the cartridge unit is deformable, and the interior space has a volume that is at least partially formed by a receiving space in which a quantity of the photosensitive substance can be accommodated for at least a duration of an irradiation and curing process and is accessible to the radiation triggering curing of the photosensitive substance.

Instead of a substantially rigid cartridge of the known type, the approach according to the invention provides a cartridge in which the casing and the bottom are at least partially flexible and made of at least one material. The flexible design of the casing allows the cartridge case and, if necessary, the entire cartridge body to be deformed, for example by way of compression of the cartridge, facilitating a direct generation of the layers and adhesion of the layers to the object support (hereinafter 'support'), with subsequent separation of the layers from the reference surface, while the photosensitive substance is located within the cartridge at least partially during the building process. As the number of generated layers increases, the cartridge is stretched, or is compressed (deformed) less, allowing it to restore the original shape thereof upon insertion into the apparatus after the object to be generated has been completed, if so desired. It shall be noted that a casing shall be understood to mean those parts of the cartridge which delimit the interior space with respect to the outside; optionally present, additional components that can be moved inside the interior space, such as a ram, a doctor blade or valve parts, do not form part of the casing within the meaning of the present invention.

The invention thus also allows the photosensitive substance to be stored more efficiently and variably within the stereolithography apparatus, and the generated layers to be gently separated from the reference surface. Further advantages include the improved and easier control of the relative movement of the support of the generated layers or of the generated object with respect to the reference surface, and the simplified supply and handling of photosensitive material in the stereolithography apparatus.

The cartridge may furthermore be equipped with an information carrier, via which the quantity, the type, the state and process parameters can be inferred. Accordingly, a cartridge unit may include an information carrier which holds information regarding the photosensitive substance, and in particular with respect to the quantity, type and/or state thereof, and/or process parameters of a process of producing a three-dimensional object, and/or transmits this to the stereolithography device, for example to a control unit thereof. The information carrier may be an imprint, a bar code, an RFID chip, a magnetic strip or the like, for example.

As mentioned above, it is advantageous when the cartridge unit can be detachably inserted into a stereolithography device of the kind disclosed herein. In an advantageous refinement of the invention, the cartridge unit may be detachably fastenable or fastened to the object support so as to facilitate a replacement of the cartridge.

The deformable area of the casing may have a one-piece design, and preferably be made of a flexible material, but may also have a multi-piece design if necessary. A jacket portion of the cartridge can be composed of a film tube (such as FEP or PTFE film), while the bottom of the cartridge, in which a transparent bottom part (which in the simplest case is at least a piece of glass), for example, is located, is a simple injection-molded part made of suitable plastic material, as is the closing top part of the cartridge. Depending on the design, the bottom part or the top part may include the reference surface.

Furthermore, the volume of the interior space may be formed predominantly, and preferably entirely, by the receiving space. The reference surface is located either on the bottom (or the cover surface) of the receiving space or is defined by a suitable surface in the receiving space, for example a membrane, an interface between two (for example layered) liquids or at least one photosensitive substance having different states in the receiving space. The casing can, advantageously, be realized so that the surrounded interior space has a volume that remains substantially the same during a deformation of the casing. In many embodiments, the deformability of the casing is realized such that a reversible compression with respect to a height of the cartridge unit is permitted. In most instances, compressive deformation is what is primarily desired, and in these cases the deformability may thus be limited to such a reversible compression. The compression (or, opposite thereto, the stretching) may be generated, for example, by a relative movement between a base plate of the support unit and a holding unit, which holds an end of the cartridge unit located opposite the base plate; in general, two ends of the cartridge unit are each held in the support unit by a holding means, and the compression or stretching of the cartridge unit takes place by a relative movement of the holding means with respect to one another.

In many embodiments, the casing may have a geometric shape that can be folded onto itself. In addition or as an alternative, the casing may comprise at least one reference surface, which may have a rigid, partially flexible or completely flexible design. It is favorable when the reference surface formed in the casing can be moved or deformed arbitrarily in space.

The casing can, advantageously, be shaped so as to comprise a bottom, a top part, and a jacket connecting the bottom and the top part, wherein the jacket is preferably deformable. The bottom of the casing may be realized rigid or flexible, comprising at least one layer, and/or may be composed of multiple materials.

According to a further refinement aspect of the invention, the bottom of the casing and/or the jacket may comprise at least one perforatable area, preferably weakened area(s), for creating at least one opening for supplying or removing a photosensitive substance and/or for supplying or removing solvent into and/or out of the interior space.

The casing of the cartridge unit according to the invention may comprise a closed bottom that is impermeable to the photosensitive substance and formed of at least one part, and side walls. However, these may be designed to be permeable to gases or gas mixtures. Within this meaning, it is favorable when the aforementioned jacket is designed to be pervious (permeable) to gases or gas mixtures, and in particular to oxygen or air. The bottom may also be pervious to gas in this manner.

Furthermore, the casing may include a closable opening on the upper face and/or on the side, through which the photosensitive substance can be supplied to the interior space and removed therefrom. The casing can, in particular, also include lateral openings or opening extensions. The casing may comprise sealing elements for sealing the opening. The casing may thus comprise sealing elements on the upper opening and on the bottom side. Moreover, the opening may be closable by way of a closure element, which preferably has a one-piece design, wherein the closure element is preferably realized as a support for the cured layers of the photosensitive substance.

The one-piece or multi-piece cartridge may comprise geometric, mechanical or magnetic elements, which can be joined by way of a fixation to at least one element that is able to carry out a relative movement. Furthermore, an advantageous refinement of the cartridge unit may comprise a component that is movable in the interior space and guided in the cartridge unit by way of guides of a geometric, mechanical and/or magnetic nature. Components movable in the casing may be doctor blades, rams, flaps serving as valves or the like, for example.

One embodiment of the invention provides that the cartridge unit may comprise a closure part that upwardly delimits and closes the interior space, wherein this closure part may be replaceable and preferably have an overall rigid design. This closure part may include suitably shaped geometric clearances, which is to say recesses or openings, in a surface facing the interior space of the cartridge. Clearances of this kind allow photosensitive liquid from the capsule to penetrate into the interior space of the casing, for example. Another advantageous use of clearances is that of improving the adhesion of the three-dimensional object to the surface serving as the support. The closure part may moreover have a one-piece or multi-piece design. By way of a suitable geometric configuration of the closure element, it is possible to provide at least one area in which photosensitive resin or resins can be stored directly or indirectly.

Favorably, the closure element can make it possible to accommodate at least one object filled with photosensitive resin, which is preferably implemented so as to be perforatable. Accordingly, it may be favorable when the area is configured to accommodate a receptacle comprising a photosensitive substance, wherein preferably means for perforating the receptacle are provided.

In addition, the closure part can comprise at least one integrated plunger, the stroke of which allows the delivery of the photosensitive substance to be metered. The plunger can moreover comprise units for perforating or opening a receptacle present in the closure part, and in particular a receptacle comprising a photosensitive substance. The at least one plunger may thus be able to damage at least one bag-shaped element as a function of time so as to release photosensitive material.

Additionally, the plunger may comprise units for supplying a solvent and/or a gas or a gas mixture, and in particular nitrogen or air.

Moreover, the cartridge unit can, advantageously, comprise an oxygen-permeable one-piece or multi-piece bottom.

So as to facilitate a detachment of the produced three-dimensional object, moreover a unit for generating vibrations may be provided in the device according to the invention.

The stereolithography device according to the invention may be provided for the insertion of one, two or more cartridges. In particular, a plurality of cartridge units may be inserted in the device.

Further details and preferences of the invention will be apparent from the following description of several exemplary embodiments, which are illustrated in the accompanying drawings and are not limiting to the invention. The drawings show the following schematically:

FIG. 2 shows an exploded view of a cartridge unit, which can be inserted in the device of FIG. 1.

FIG. 2a shows the cartridge unit of FIG. 2 when assembled;

FIG. 7 shows a perspective view of a second embodiment of a closure part;

FIG. 8 shows a longitudinal section of the closure part of FIG. 7;

FIG. 9 shows the closure part of FIGS. 7 and 8 with the stopper removed;

FIG. 15 shows a cartridge closure part comprising information carriers provided thereon;

FIGS. 16a-16d illustrate, based on a sequence of four stages, the generation of a cured layer of the photosensitive substance, using a cartridge unit according to the invention;

Figure 1:
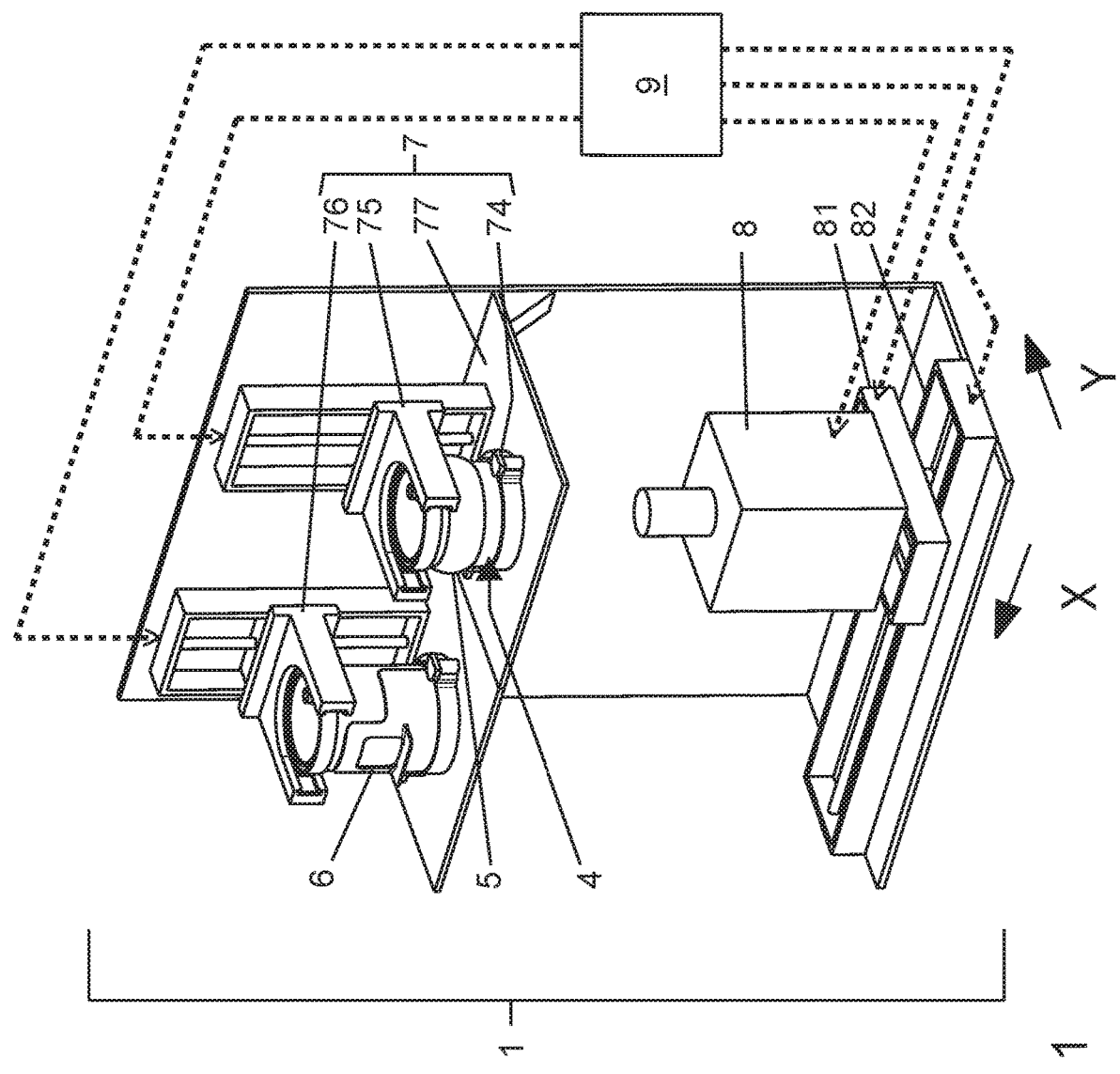
FIG. 1 shows a perspective view of a stereolithography device according to one exemplary embodiment of the invention.

FIG. 1 shows an exemplary overview of an exemplary embodiment of a stereolithography apparatus 1 according to the invention for the generative fabrication of one or more three-dimensional objects 2 (FIGS. 16a-16d) from individual layers, which are cured from a photosensitive substance within a respective cartridge unit 5, 6. The photosensitive substance can be cured in a receiving space 4 within the cartridge unit 5, 6 by way of actinic radiation. Within the scope of the present disclosure, "actinic radiation" shall be understood to mean (in general electromagnetic) radiation that is suitable for triggering the desired curing reaction of the photosensitive substance, and in particular light radiation such as UV light. The photosensitive substance is generally liquid, wherein within the scope of the present disclosure the term "liquid" refers to liquids having arbitrary viscosity, including suspensions and pasty substances.

One or more cartridge units 5, 6 are held by way of respective associated receiving units 75, 76 and are arranged on a base plate 77. Together with the receiving units 75, 76, including the associated drives and optionally further components (not shown in FIG. 1), the base plate 77 forms the support unit 7 of the invention.

A controllable light source 8 is arranged beneath the base plate 77, for example, where it can be horizontally positioned, preferably in two directions (X and Y), by way of stepper motor-operated linear actuators 81, 82. The light source 8 is configured to be movable relative to the at least one cartridge unit 5, 6 and, in this way, is positioned beneath the cartridge unit 6 in which a building process of an object 2 is to take place. In one variant, the stereolithography apparatus may also comprise a rotatably mounted mirror, by way of which the light emitted by the light source 8 can be directed via further deflection mirrors to multiple cartridge units, by deflection of the rotatably mounted mirror.

Each receiving unit 75, 76 is adjustable in terms of height with respect to the base plate 77 or the bottom of the cartridge system 5, 6, for example by way of a stepper motor drive. The receiving unit 75, 76 is advantageously configured to accommodate, center and hold the cartridge unit held therein in a certain position relative to the base plate; preferably, the receiving unit 75, 76 holds the top part (closure part) of the cartridge unit and is thus able to set the height of the cartridge unit, and compress the same, by way of a movement with respect to the base plate. The support unit 7 may furthermore comprise a fastening element 74, for example a body that enables form-locked locking, for one or each of the cartridge units 5, 6, and the bottom part of the cartridge system 5, 6 can be secured, by way of the fastening element 74, at least for the duration of the development process. A control unit 9, for example a control computer, controls the movement of the units 75, 76, 81, 82, and the sequences of the manufacturing process in the apparatus 1, including the activity of the light source 8, and, if necessary, the control unit also receives and processes measuring and/or sensor signals recorded by sensors in the cartridges 5, 6.

Figure 14A:
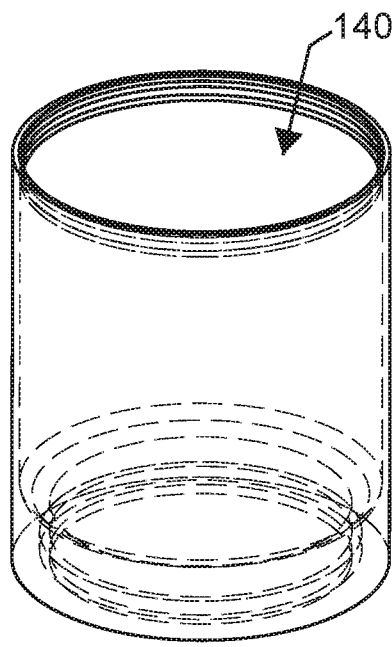
FIGS. 14a-14d show multiple variant embodiments of the casing of the cartridge unit according to the invention.

FIG. 2 shows a cartridge system 10 in an isometric exploded view (resolved in the Z direction) as one exemplary embodiment of a cartridge unit according to the invention, which can be inserted in the stereolithography device of FIG. 1; FIG. 2a shows the cartridge system 10 when assembled. The cartridge system 10 of the shown embodiment comprises, for example, a closure part 11, which may be identical, for example, to the closure part described hereafter in FIGS. 3-6, a casing 14 (for example, identical to the casing 141 of FIG. 14a), and an additional bottom 15, which is preferably at least partially transparent to actinic radiation, a locking part 16, and a cartridge reinforcement part 17. Of course, the closure part, the casing, including the bottom, and the locking part may also be implemented in accordance with the other configurations disclosed herein, or further embodiments which a person skilled in the art will be able to discern within the scope of the invention.

The locking part 16 is provided to additionally reinforce the casing 14, and this component 16 can furthermore enable referencing, centering, force-fit and/or form-locked fastening of the at least partially flexible cartridge system 10 in the stereolithography device 1 (FIG. 16). Moreover, the locking part 16 prevents the lower cartridge area from bulging, deforming, bending and/or lifting off.

So as to be able to safely handle the at least partially flexible cartridge system 10 outside and inside the stereolithography apparatus 1, the cartridge system 10 may comprise a cartridge reinforcement part 17, which is designed, for example, at least in a half-shell shape and adapted to the geometry of the flexible casing 14 of the cartridge system 10. A desired height of the cartridge system 10 is defined by way of the cartridge reinforcement part 17. The cartridge reinforcement part 17 may also be configured so as to be easily pulled from the cartridge system 10, which can be achieved by way of a handle or a window, for example. The cartridge reinforcement part 17 is preferably configured to be able to form a releasable form-locked or force-fit joint with the locking part 16, the casing 14 and/or the closure part 11 on at least one end, for example by clamping on the part 17 in the manner of a clip.

Figure 3:
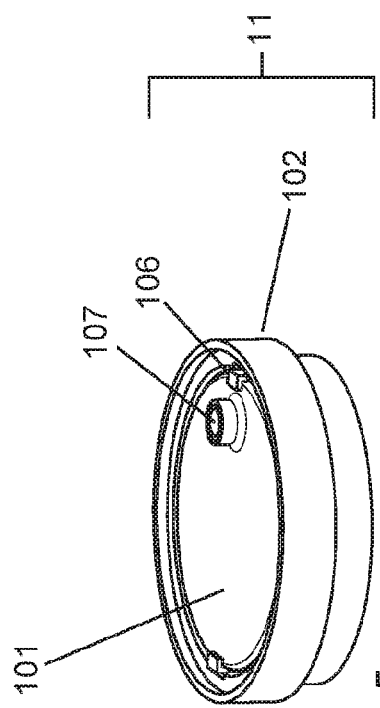
FIG. 3 shows a perspective view of a first embodiment of a cartridge closure part comprising a support and a capsule to be inserted therein.

FIG. 3 shows an oblique view from above and the side of a first embodiment of the closure part 11, comprising a support 102 of the generated layers (these are, as mentioned, built up on the bottom side of the support) into which furthermore at least one capsule 101 can be inserted. The capsule 101 is still shown above the support 102 while not yet inserted and not perforated. At least one photosensitive substance, which may be a liquid having any arbitrary viscosity or pasty consistency, for example, is present in the capsule 101. The capsule 101 is closed by a capsule closure element 107. This closure element 107 may also be realized as a pressure control valve or comprise such a valve. In one variant (not shown) of the capsule 101, this may comprise a pressure control valve itself.

Figure 4:
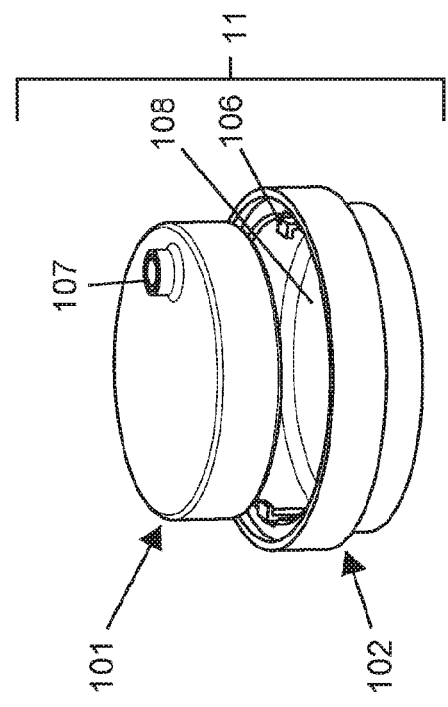
FIG. 4 shows a longitudinal section of the closure part of FIG. 3.

FIG. 4 shows a sectional view (longitudinal section along the center axis) of the capsule 101 and of the support 102. The (unperforated) capsule 101 comprises a certain amount of the photosensitive substance 3 having a starting fill level HO. The support 102 has at least one opening 109 through which the photosensitive substance 3 exiting the capsule 101 can reach the area beneath the support 102. In this embodiment, the capsule 101 comprise one or more areas 104 having a lower wall thickness on the bottom side 110 thereof. These weakened areas 104 are provided for perforation by projecting profiles 105 of the support 102. The projections 105 are located on the bearing surface 108 of the support for the capsule 101 and are designed, for example, as raised edges, which each surround an outwardly directed opening 109. When inserted in the support 102, the capsule 101 may be fixed by one or more, preferably engaging, holding means 106, which may be realized as resilient detent hooks 106, for example. The capsule 101 can thus be inserted from above in the support 102, while being perforated at the same time.

It goes without saying that the capsule 101 may also be fixed in the support 102 in another manner, for example by a bayonet catch or an additional part that is inserted after the capsule has been inserted and fixes the latter by engagement in the support; the capsule 101 may also comprise a thread and be screwed into the support 102.

In one variant embodiment, the perforation may also take place by an additional part provided on the bearing surface 108, for example a blade or a syringe needle. In a further variant embodiment, the capsule has a multi-piece design, wherein the bottom side 110 of the capsule 101, at least in some regions, is formed of a material that is easy to perforate, such as a film. In this case it is possible to open the capsule 101 by perforating the film or by peeling the film off an area of the bottom side 110 covered by the film.

In a further embodiment, which is not shown, the support 102 comprises a toothed ring or teeth configured, for example, on the lateral surfaces (in the manner of a spur gear). This allows a rotation with respect to the bottom of the cartridge casing by a small angle α (Greek letter alpha) of a few angular degrees. As a result of this rotation, the forces required for detaching the produced object from the reference surface can be considerably reduced.

Figure 5:
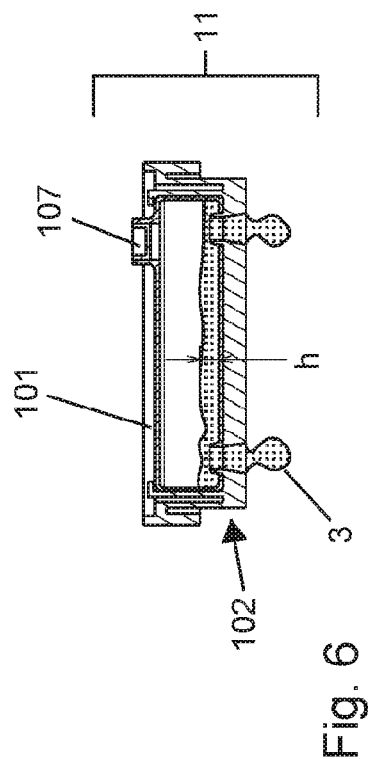
FIG. 5 shows a perspective view of the closure part of FIG. 1, comprising an inserted capsule.

FIG. 5 shows an oblique view of the support 102 comprising the capsule 101 inserted therein, whereby the cartridge closure part 11 is formed.

Figure 6:
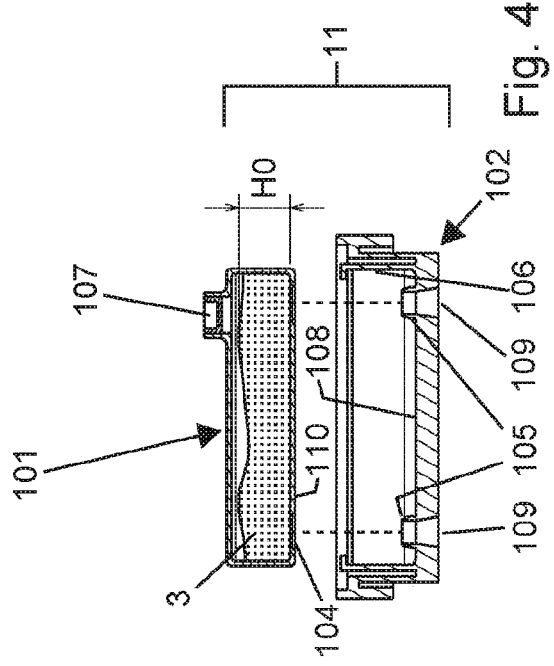
FIG. 6 shows a longitudinal section of the closure part of FIG. 5.

FIG. 6 shows a sectional view (longitudinal section along the center axis) of the capsule closure part 11. Due to the perforation of the capsule 101 by the projections 105, the photosensitive substance 3 is able to exit through the openings 109 provided in the support 102. The fill level, as shown in FIG. 6, thus decreases from the starting fill level H0 (FIG. 4) to a level h.

FIGS. 7 and 8 show an oblique view and a sectional view (corresponding to those of FIGS. 5 and 6) of a second embodiment of the cartridge closure part 200, comprising a support 202, a lid 201 and a stopper 208. The support 202 contains the photosensitive substance 3. An opening 209 formed in the bottom surface of the support 202 is closed by the stopper. The stopper 208 comprises a grip element or a tab and is guided upwardly outward through an opening 207 of the lid 201; when inserted, the stopper seals the lid 201 and the support 202 to prevent photosensitive liquid 3 from exiting, wherein the sealing effect in the openings 207, 209 may be achieved by integrated material-locking insertion, screwing or additional geometric profiles, as well as additional components, such as O-rings, sealing elements or the like. The lid 201 closes the interior space of the support 202, for example by way of a force-fit and/or form-locked but sealed joint 210.

FIG. 9 shows how the photosensitive substance 3 exits the support 202 the opening 209 on the bottom after the stopper 208 has been removed. So as to facilitate the exiting of the photosensitive liquid 3, the geometry of the opening 209 may be suitably shaped for this purpose. In addition, the support 202 and the lid 201 may be coated on the inside, on the surfaces that come in contact with the photosensitive substance 3, with a material that ensures that as little of the photosensitive substance 3 as possible remains in the interior space of the support 202 after emptying. This may be achieved, for example, by way of a coating with FEP, PTFE (Teflon) or other materials that lower the surface tension or wetting. This variant enables easy re-filling of the cavity as well as easy cleaning. Advantageously, the stopper 208 may be configured such that reclosing and filling through the opening 207 is possible.

The stopper 208 could additionally comprise filling channels (not shown), which allow the cavity to the filled through the stopper; for this purpose, the filling openings may be realized as boreholes introduced from above, which meet lateral borehole openings beneath the lower end of the stopper (inverted L or T shape of the channel). As an alternative, the lid 201 may have a closable separate opening (not shown) suitable for filling.

Figure 10:
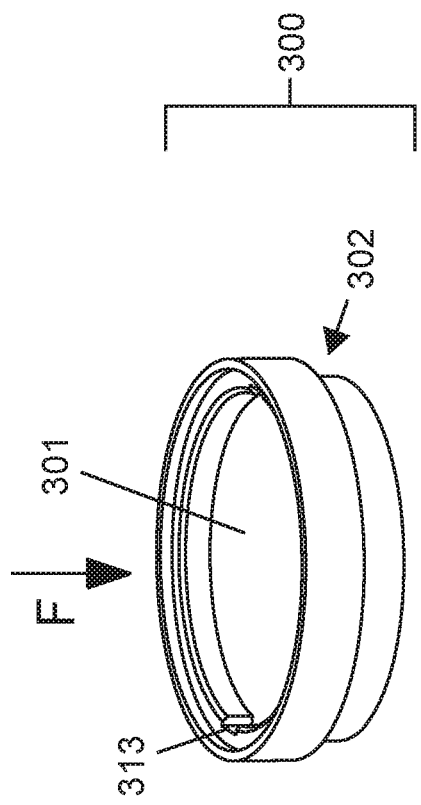
FIG. 10 shows an embodiment of a closure part assembled from multiple components in a perspective view.
Figure 11:
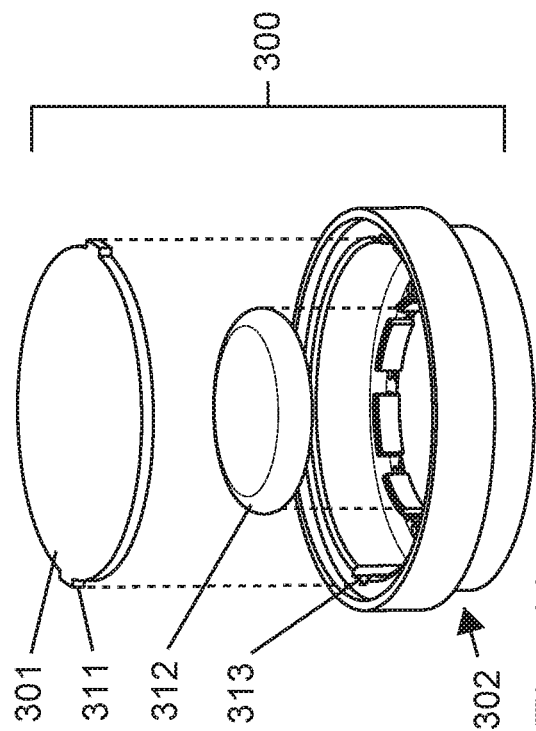
FIG. 11 shows a longitudinal section of the closure part of FIG. 10 when assembled.

FIGS. 10 and 11 show a third embodiment of the closure part 300, in which a ram or plunger 301 is guided inside the support 302. The guidance of the plunger 301 preferably takes place by way of guide elements 311 and 313, for example in the form of projections or protuberances 311, which engage in guide grooves 313 on the inside of the support 302, and which may thus be used for centering and guidance and as anti-turn elements. The plunger 301 may furthermore be configured to be removable from the support 302. This embodiment allows the closure part 300 to be re-equipped with a bag-like receptacle 312 filled with a photosensitive substance 3. The receptacle 312 is made at least partially of a perforatable material, which preferably is also impenetrable to light (such as a plastic film or coated aluminum foil). On the side facing the receptacle 312, the plunger 301 comprises elements 305 formed on the inner surface, for example in the form of needles, teeth or blades, which allow the bag-like receptacle 312 to be perforated in a targeted manner; in addition or as an alternative, the support 302 may also include such perforating means itself. The perforation may also take place in a controlled manner from the outside, for example by a needle-like body. In a further variant embodiment, the receptacle 312 filled with photosensitive substance 3 may comprise multiple sections, which are each filled with a photosensitive material. Due to an external, for example controlled, perforating body, the individual section can thus be perforated in a targeted sequence.

As is also apparent from FIGS. 10 and 11, the support 302 may furthermore be configured so as to be able to accommodate the bag-like object 312 and fix and/or center the position thereof.

For this purpose, an area for accommodating the bag 312 may be surrounded by a rim or a number of tabs. The sectional view of FIG. 10 shows the multi-piece closure part 300 comprising the bag-like object 312 held in the support 302 in the starting position having the plunger position h1 (measured as the distance from the upper edge of the support 302).

Figure 12:
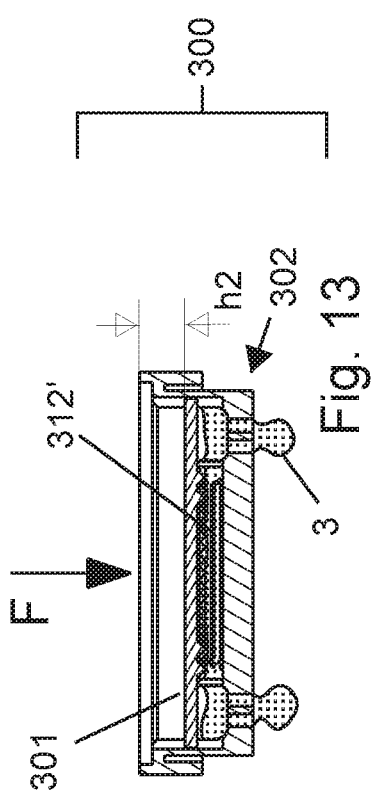
FIGS. 12 and 13 show the closure part of FIGS. 10 and 11 with the plunger actuated.
Figure 13:
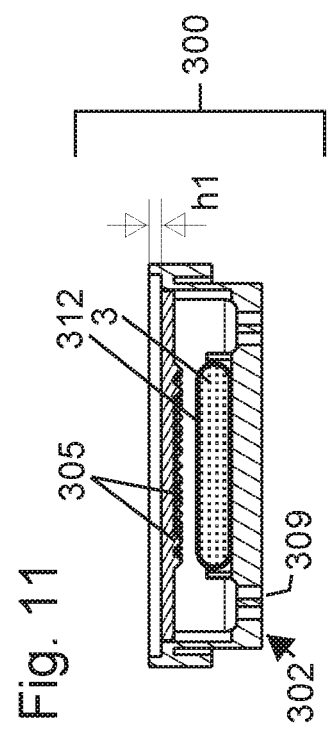

The oblique view of FIG. 12 and the corresponding sectional view of FIG. 13 show the closure part 300 in a state in which the plunger 311 is in the end position h2 thereof. Proceeding from the starting position h1, any arbitrary position between the positions h1 and h2 of the plunger 301, and ultimately the end position h2, may be achieved by the application of an external force F. In one variant (not shown) where the plunger comprises, for example, a helical cam or a thread having a certain pitch rotatably in the support 302, the plunger may also be moved by applying a circumferential force (for generating a rotational movement).

During the movement from the starting position h1 toward the position h2, the bag 312 is pierced by the perforating elements 305 and thereby opened. In the position h2 shown in FIG. 12, the perforated bag 312' has dispensed the photosensitive substance 3, which thus flows into the interior space of the support 302 and from there exits the support 302 through openings 309 provided for this purpose. In a preferred embodiment, it may be provided that the plunger 301, in cooperation with the support 302, is configured to allow not only the perforation, but also a compression of the receptacle 312, and thus substantially complete emptying of the latter. It goes without saying that it is not essential for the plunger 301 to be a part of the closure part 300, and moreover the plunger may, in general, have a multi-piece design, which is to say may be divided into multiple sub-plungers, so that these multiple plungers can be moved independently of one another.

FIGS. 14a-14d show several examples of design variants 141, 142, 143, 144 of the at least partially flexible casing according to the invention of the cartridge unit according to the invention in schematic oblique views. The casing may have a single-piece design, for example, but may also be composed of two or more components. The basic geometry of the casing 14, 141-144 may have any arbitrary geometric configuration, depending on the desired field of application, surrounding an interior space 140; for example, the casing may have a cylindrical or prismatic shape, having a circular, oval, square or rectangular outline, and the edges of the basic polygon may additionally be rounded. The casing has preferably a cup-like basic shape, wherein it may comprise a bottom and a jacket. The jacket forms a lateral wall connecting the bottom and a top part, and the top part may form part of the casing or be formed by an additional component, such as a closure part 11, 200, 300, 400. In particular, preferred configurations of the casing have a rotation-symmetrical design or have at least partially a box-shaped outline.

For example, the casing 141 may comprise a jacket having smooth outer and inner surfaces, as is shown in FIG.

Figure 14B:
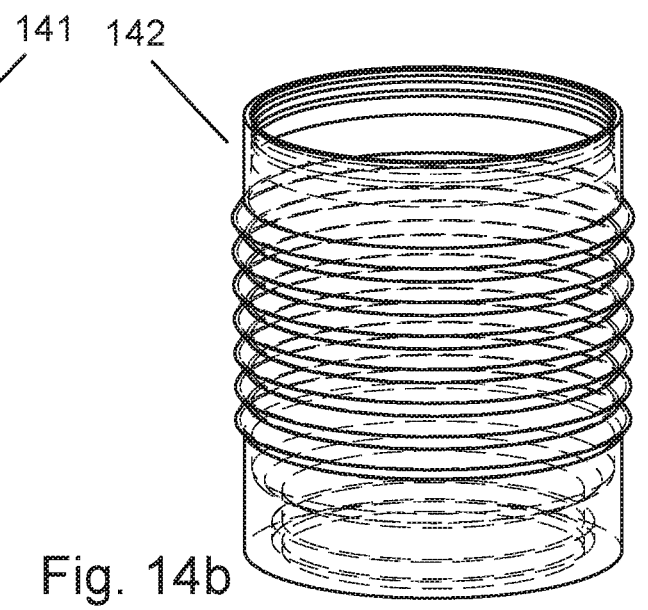

14a. A more complex casing geometry is likewise possible, as is shown in FIGS. 14b and 14c. FIG. 14b shows bellows-like folds of the jacket of the casing 142, allowing easier folding of the casing 142. The casing 142 has a jacket geometry that, in sections, has the function of a bellows. In other examples (not shown), the jacket of the casing may have a conical, trapezoidal, converging design so as to facilitate folding of the casing geometry. The casing includes at least one opening and/or suitably designed appendages and/or openings. FIG. 14c shows one example of a casing 143 that is formed rotation-symmetrically in a single-piece in the base body and includes one or more openings via a bottom, into which an additional component 145 and/or a multi-layered bottom, which is composed of different materials, and optionally a closing transparent plate may be inserted, whereby a cavity is formed, which may be filled by way of the component 145, as will be described in greater detail hereafter based on FIG. 17. As an alternative, components formed on the casing, such as inlet/outlet connectors or the like, may also be realized in one piece with the casing. In addition, referencing FIG. 14d and the casing 144 shown therein, the casing geometry may be provided with at least one recessed and/or raised geometric profile 146 (such as a groove or a rib) in the lower area of the casing 144, by way of which an additional bottom 15, 25 (FIGS. 2 and 17) can be fastened, which is at least partially transparent, for example made of Plexiglass, acrylic glass or float glass, to actinic radiation for curing the photosensitive substance and forms an additional cavity beneath the bottom of the casing 141-144. Furthermore, this profile may provide an orientation option and/or fastening option for the casing 144.

FIG. 15 shows an example of a cartridge closure part 500 having one or more information carriers 502, 503 provided on the outside thereof (the upper face of the lid 501 here), in which information regarding the photosensitive substance, and in particular with respect to the quantity, type and/or state thereof, and/or process parameters of a process of producing a three-dimensional object is stored. Data can be transmitted from the information carrier via suitable transmission paths to the stereolithography device, for example the control unit 9. The information carrier may be an imprint, a bar code 503, an RFID chip 502, a magnetic strip or the like, for example.

FIGS. 16a-16d represent a sequence of individual stages or phases, which serve to illustrate the function of the cartridge unit according to the invention (based on the example of a cartridge system 10 of FIG. 2) in one possible embodiment of a stereolithography apparatus 1 according to the invention. For the sake of improved clarity of the illustration, only the light source 8 of the apparatus 1 and the cartridge system 10 are shown in these figures, while the units for holding, positioning and potentially deforming (compressing/stretching) the cartridge system 10 are not shown. FIGS. 16a-16d illustrate the production of a three-dimensional object 2 based on a single build cycle for a layer Bn of the object 2, of which previously the layers B1 to Bn−1 have been generated. In the drawings of the present disclosure, the three-dimensional object 2 is shown as a component having an inverted pyramidal shape, which is merely intended to be exemplary and shall not be limiting; it is possible, of course, to generate a wide variety of shapes of three-dimensional objects. The build cycle for the layer Bn, using a photosensitive substance 3, comprises the following phases:

Phase 1: starting position at the height A1 (FIG. 16a);
Phase 2: lowering the support to the height A2 (FIG. 16b), where A2<A1;
Phase 3: exposing or generating the layer Bn (FIG. 16c);
Phase 4: lifting off the support (FIG. 16d), and optionally removing the cured layer Bn from the mold.

With this, an end position is reached, which corresponds to the starting position (phase 1), except having a height A3>A2. The height A3 may correspond to or be different from the height A1 prior to the shown build cycle. Frequently, A3>A1 since the size of the component increases.

FIG. 16a represents the starting situation, in which the capsule 111 is already perforated, from which the photosensitive substance 3 flows into the interior space 140 of the cartridge system 10, where it fills or covers the bottom of the casing 14, which represents the receiving space of the invention. In the starting position (phase 1) having the height A1, n−1 component layers of the component 2 have already been generated, and the most recently formed layer Bn−1 is located in a position over the bottom of the casing 14.

Thereafter, as is shown in FIG. 16b, the upper part of the cartridge system 10 formed by the closure part 11 is lowered, compressing the same. The closure part 11 is advantageously lowered until the layer Bn−1 makes contact (again) with the photosensitive layer 3. The layer Bn−1 is advantageously positioned so as to be located above the reference surface 41 by the desired layer thickness of the layer Bn to be formed. As the closure part 11 is being lowered, photosensitive liquid 3 may continue to exit the capsule 111, if necessary, wherein the liquid photosensitive substance 3 still present beneath the layer Bn−1 is displaced until the desired layer thickness of the layer Bn is reached; in other words, the photosensitive substance 3 fills the gap between the layer Bn−1 and the reference plane 41 formed by the bottom of the casing 14 or, where necessary, a non-reactive phase 33 (see FIG. 17) of the photosensitive substance 3. According to the invention and in keeping with the configuration, the deformable casing 14 assumes a compressed, which is to say folded and/or bulged, state.

In phase 3, illustrated in FIG. 16c, the new component layer Bn is cured by way of actinic radiation 80, such as UV light, which is emitted by the light source 8 and focused onto the areas of the layer Bn on the reference surface 41 to be developed. In this process, analogous to conventional stereolithography methods, the structure of the layer Bn is generated by selection of the exposed areas of the layer Bn.

In phase 4, the layer Bn thus cured in phase 3 is lifted off the bottom of the casing 14 or the phase 33 by way of a relative movement of the closure part 11, whereby the newly formed layer Bn is separated from the reference surface 41. The casing 14 is elastically deformed in keeping with the magnitude of the stroke of the upward movement, and more particularly in general is partially relaxed.

Figure 17:
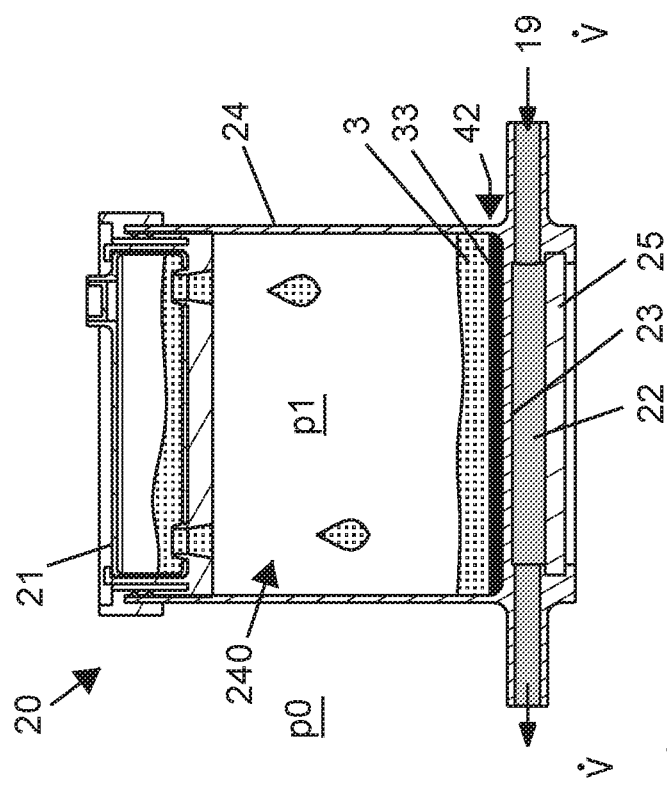
FIG. 17 shows a further embodiment of a cartridge system.

FIG. 17 shows another embodiment of a cartridge system 20, in which the casing 24, for example, is substantially patterned after the casing 143 of FIG. 14c, in a longitudinal sectional view. A cavity 22, which is formed between the outer glass bottom 25 and the bottom side 23 of the casing 24, is present beneath the casing 24. Due to the lateral extensions of the casing 24 or other openings (not shown) provided for this purpose, the cavity 25 may be flooded with a fluid 19 (for example, oxygen or another gas suppressing the reaction) or other inhibitors (volume throughput VS). A non-reactive phase 33 of the photosensitive substance 3 forms due to the inhibitor penetrating through the permeable bottom of the casing 24 into the interior space 240 of the cartridge, in this embodiment the surface of the non-reactive phase, instead of the (inner) bottom surface of the casing 24, forming the reference surface 42. A reference surface 42 thus formed offers the advantage that the generated layer of the component 2 does not adhere to the bottom surface of the casing 24, and thus the risk of the bottom layer sticking and possibly tearing is avoided.

In this embodiment, or other shown embodiments, it is further possible to apply a pressure p1 to the interior space of the cartridge system, the pressure being larger or smaller than the ambient p0, which may take place through openings (not shown) provided for this purpose in the closure part 21 and/or the casing 24. The interior space of the cartridge system can be flooded with a specific inert gas (such as nitrogen), for example, which prevents oxygen inhibition of already formed layers, and thus positively influences the mechanical strength of the layers and the surface quality thereof.

Figure 14D:
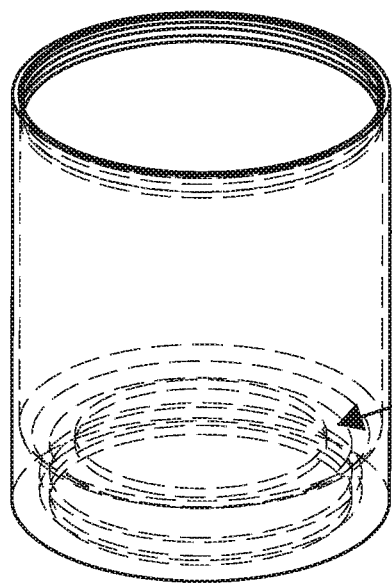
Figure 14C:
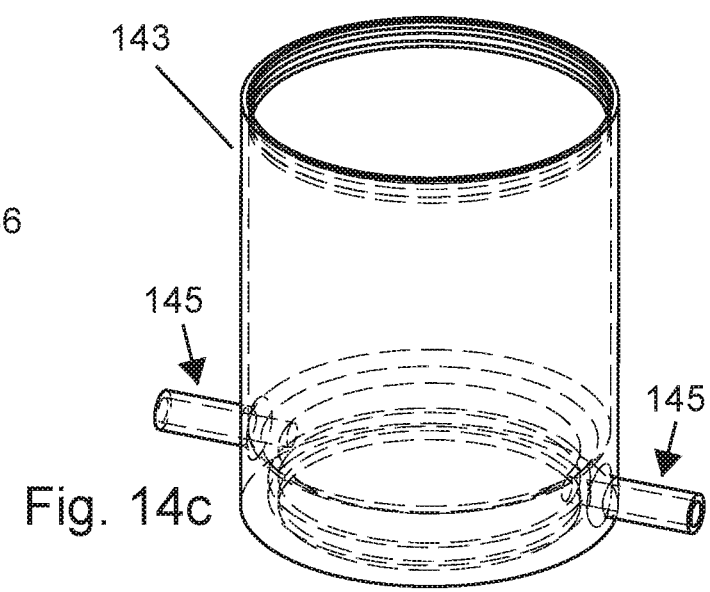
Figure 18:
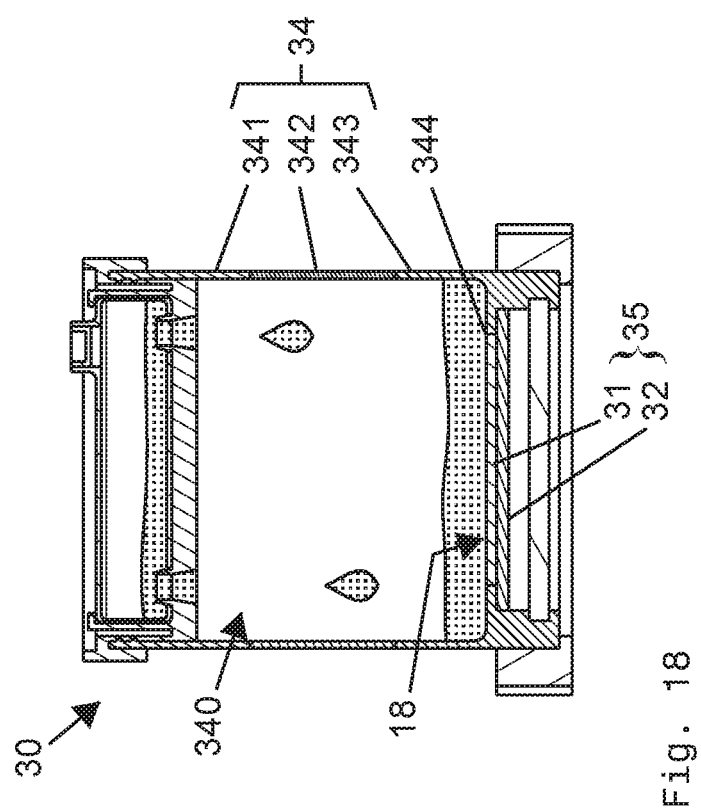
FIG. 18 shows another embodiment of a cartridge system.

FIG. 18 illustrates a further possible embodiment of the casing 34 (which is designed corresponding to the casing variant 144 of FIG. 14d) and a composition of the cartridge system 30. In this variant embodiment, the casing 34 comprises a discontinuous bottom 344 (which is to say not solid), which thus includes an opening 18 (or a plurality of such openings). This opening is closed by way of an inserted plate- or leaf-shaped component or component combination 35. This component 35 may have a multi-piece design, where necessary, and ensures a closed interior space 340 of the cartridge system 30 and the upper face thereof forms the reference surface. The component 35 may have a sandwich design, for example, which is at least partially transparent to the actinic radiation used for curing the photosensitive substance 3 and is at least partially permeable to gases; for example, an elastic film 31 (such as FEP film, Teflon film) may be formed on a support part 32 made of a material such as microporous glass, which exhibits particularly good permeability to the gas or gas mixture used for forming a non-reactive phase 33 (see above with respect to FIG. 17).

FIG. 18 furthermore shows another aspect of implementing the casing, based on the variant of the casing 144 of FIG. 14d, wherein the jacket of the casing 34 is formed of multiple segments (341, 342, 343), and the individual segments may have differing material properties. This allows a cartridge casing to be formed which comprises, for example, areas having differing flexibility and/or differing optical properties. A segmentation of the jacket can, of course, also be provided with any of the other embodiments shown herein.

Figures 19A, 19B:
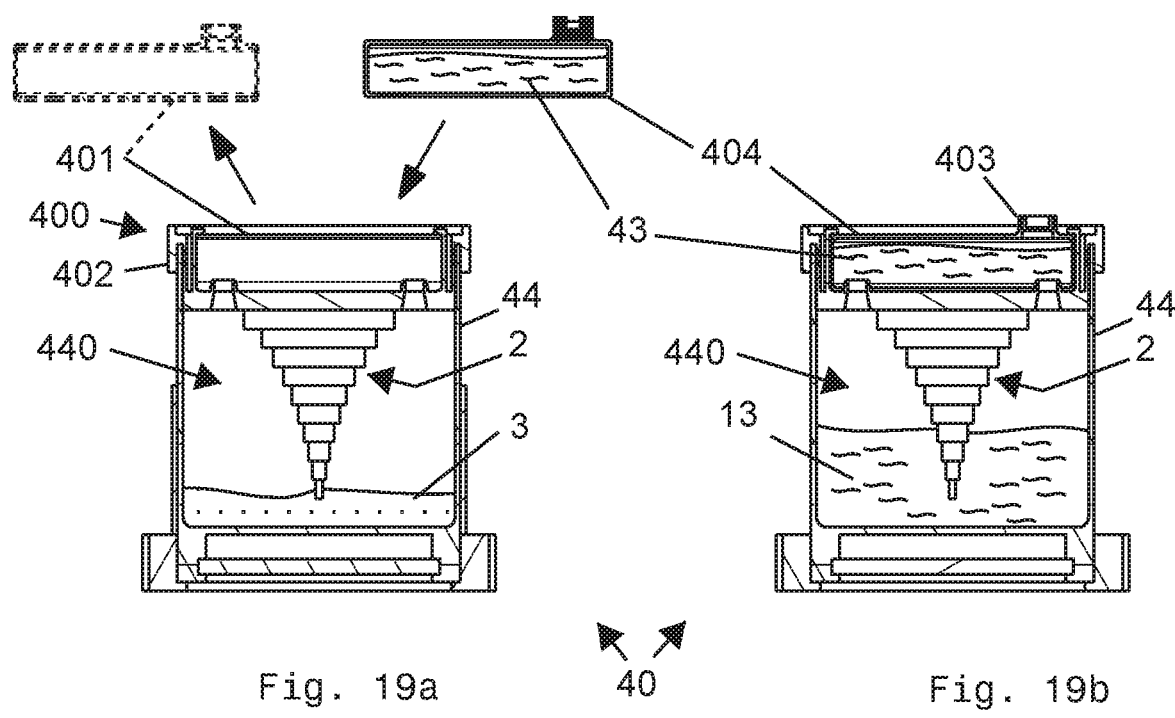
FIGS. 19a and 19b illustrate the replacement of a capsule of the closure part.

A further aspect of the invention is shown in FIGS. 19a and 19b, based on sectional views of a cartridge system 40 according to the invention, namely the replacement of a capsule so as to switch between different processing types, such as from a layer build process to a cleaning process. FIG. 19a shows the cartridge system 40, in which an object or a component 2 was built by way of the photosensitive substance 3, in accordance with the sequences described above; the photosensitive substance 3 is provided by a capsule 401, which is inserted into the support 402 of the cartridge system 40. By removing the capsule 401 and replacing the same by inserting a new capsule 404, which is compatible with the closure part 400 of this exemplary embodiment, it is possible to supply a different substance instead of the photosensitive substance 3. For example, the capsule 404 can be filled with a solvent 43, such as isopropanol. As a result of the insertion of the capsule 404 and perforation of the outer casing of the capsule 404 in the course of the insertion into the interior space of the support 402 of the closure part 400, the solvent 43 is released and can reach the interior space 440 of the cartridge system 40 through the openings of the closure part 400. As is shown in FIG. 19b, the solvent 43 partially or completely fills the interior space of the cartridge system 40, thereby allowing the component 2 to be cleaned, and in particular photosensitive substance 3 still adhering to the component 2 to be removed and/or residual photosensitive substance 3 present in the interior space, which has not yet or only partially cured, to be dissolved. Due to the photosensitive substance 3 dissolving in the solvent 43, a solution or mixture 13 is formed in the interior space of the cartridge. This may now be drained via openings in the closure part 400 by tilting or inverting the cartridge 40. For example, the mixture 13 may flow out of the interior space 440 of the cartridge system 40 through the openings in the support 402 during removal of the capsule closure part 403. If desired, the liquid may then be replaced with new solvent. The cartridge unit may be configured so that a dissolution of the photosensitive substance 3 can be promoted by vibration, centrifuging, shaking, increasing the temperature or other suitable measures.

Similarly to what is shown in FIGS. 19a and 19b, it is also possible to switch between different types of photosensitive substances, for example when the object 2 is to be composed of different materials, and/or different liquids are desired for cleaning and/or post-curing of the object 2.

A replacement or a continuous exchange of the liquids may also be achieved by supplying a new (in general, a liquid or suspension-like) substance via a first opening in the support 402 or the casing 44, which displaces the substance in the interior space; the substance thus displaced can drain via a second opening. Suitable pumps may be provided in the supply line of the first opening and/or the drain line of the second opening.

The above embodiments of the cartridge unit or stereolithography device according to the invention can, moreover, comprise the following aspects and refinements, depending on the application:

The cartridge unit can directly or indirectly comprise the photosensitive substance and is realized in one piece or assembled from multiple components. The casing may have a three-dimensional shape and is preferably realized in one piece, wherein the deformable portion of the casing, which is preferably a laterally peripheral jacket, may be made of a flexible or foldable material. The bottom of the casing may be at least partially translucent and gas-permeable, and may be made of a material suitable for this purpose, for example silicone or a multi-layer material composite comprising silicone, glass and/or plastic layers, for example having a sandwich-like composition. The stereolithography device is provided with a light source, which is preferably movable and displaceable in a controlled manner, for selectively exposing the photosensitive substance, and at least one object support (also referred to as a support holder or support for short). The object support is arranged inside or outside the cartridge unit and, if necessary, may be movable relative to the bottom of the cartridge.

In another variant, the jacket portion of the cartridge may be made of a film tube (such as FEP or PTFE film), while the bottom of the cartridge and the closing top part of the cartridge are simple injection-molded parts made of suitable plastic material and/or suitable multi-layer composite materials. The costs of this variant embodiment are considerably lower than those of the silicone injection molding configuration, and the film would additionally be thinner and easier to deform.

The photosensitive material may be present in the cartridge in a receiving space (or multiple receiving spaces) formed therein, to which it has been added, for example, before the cartridge was inserted into the apparatus, or it may be supplied in one or more receptacles, which are inserted in the cartridge, for example in a receiving space within the cartridge body, the support (object support) or the casing itself, provided for this purpose. The support, which may also serve as the closure part and may have a single-piece design or be formed of multiple parts, may include at least one geometric cut-out in which the photosensitive substance or a receptacle therefor can be accommodated. This cut-out may additionally comprise a specially shaped surface or structures, or a component having a specially shaped surface or structures can be inserted therein, wherein this surface or these structures can cause a perforating effect on another body. The support or the cut-out may thus accommodate and/or store at least one photosensitive substance, containing the same directly or indirectly in a receptacle.

This eliminates complicated replenishing and dosing units and complicated cleaning of the support. A particular advantage is yielded with the cartridge system (cartridge unit) according to the invention due to the simple and contamination-free insertion and removal into and out of the stereolithography apparatus. It is possible to switch quickly, and without long cleaning and setup times, between different cartridges, which comprise different photosensitive substances, for example. It is thus also possible, for example, to activate a second cartridge in an apparatus during a build process that has already started, so as to increase the utilization of the apparatus. Moreover, since the substance quantity within the cartridge is known, it is possible to generate only a precisely defined number or a precisely defined object volume, depending on the requirement. It is thus possible, by way of the cartridge system according to the invention, to precisely define the life of the photosensitive substance, and consequently it is also possible to determine the object and material properties to be expected in the cured state, such as a desired biocompatibility. The cartridge system according to the invention can be easily removed from the apparatus, including the formed object on the support, and thereafter a post-processing system (for example, for cleaning and/or post-exposure) can be introduced, which is configured to accommodate the cartridge system and, possibly, introduce and/or remove cleaning agent, for example a solvent such as isopropanol, through openings or by perforating the cartridge itself in suitable locations.

Moreover, a specific atmosphere may be initiated in parts of the cartridge via the same and/or other suitable openings provided for this purpose. In this way, the now cleaned or partially cleaned cartridge, comprising the cleaned object on the support located therein, may serve as a cavity that is filled with inert gas. The casing is preferably at least partially translucent, and particularly preferably the casing and the bottom of the cartridge are translucent, and made of the same flexible material, such as silicone. Many advantageous embodiments are characterized in that the casing and the bottom of the cartridge are realized in one piece made from a translucent, flexible and chemically stable as well as oxygen-permeable material, such as silicone, and particularly preferably a liquid silicone rubber (LSR) material, wherein the closure part and potential other parts or portions thereof, such as the support and/or the plunger or plungers and/or the capsule or capsules filled with photosensitive material, may be made of a non-translucent material. The support may comprise at least one geometric cut-out, via which the photosensitive substance can pass through the plunger, or past the same, into the area of cartridge provided for exposure, or to the cartridge bottom, based on gravity or by way of pressure that is applied by the support.

Since the invention makes a separate storage option for the photosensitive substance in the closure part or in a cavity formed in the closure part possible, the design can preclude swelling or diffusion of the substance into more sensitive areas of the cartridge. It is advantageous when the photosensitive substance is additionally enclosed in a receptacle, for example a bag-like receptacle, or a specifically shaped receptacle body, which is preferably located in the support or allows to be inserted therein. The closure part, or more precisely portions thereof, such as the rear side of the support, is configured, based on the design and/or based on the surface properties, to perforate a receptacle (for example a bag) comprising the photosensitive substance so as to thereby release the photosensitive substance. In another advantageous embodiment, a disposable capsule filled with a photosensitive substance can be pierced by a specially shaped portion of the support, whereby the photosensitive substance is released.

The cartridge system may be usable once or be designed to be used multiple times. It may thus be configured as a disposable system or be refillable.

Depending on the configuration, the cartridge unit according to the invention enables a simpler, more precise measurement of the gas mixture, lower amounts of gas, a more precise design of the gas volume flow since the amount of the photosensitive substance is precisely known, for example as a result of the capsule filling, safer and simpler handling of the photosensitive substance, a safe and more stable process, and prevention of contamination. Furthermore, the present invention dispenses with a completely or partially gas-tight design of the apparatus since the gas can be limited to the cartridge.

In a further favorable configuration, the casing of the cartridge comprises a double bottom, which may have a single-piece or multi-piece design. The portion closing the casing (for example downwardly), which forms the reference plane, and in the simplest case also the bottom of the cartridge system, may be composed of a non-flexible or only partially flexible, multi-layer bottom, which is transparent to actinic radiation and permeable to specific gases or gas mixtures. A supporting element, which is likewise permeable to gases, may be present beneath the cartridge casing.

The connection between the aforementioned bottom surface and the casing may be configured to be gas-tight. The casing itself may comprise sealing elements, such as special beads. In another advantageous variant embodiment, the casing of the cartridge may be configured such that a double bottom is formed with respect to the casing only after insertion into the apparatus according to the invention, wherein the transitional part is configured completely or partially gas-tight. The cartridge unit itself may moreover also be stored in a gas-tight cladding in the apparatus, such as in a pipe. This creates a geometrically arbitrarily shaped cavity which, depending on the requirements and possibilities of the application, may comprise at least one access opening and/or at least one discharge opening, via which a specific gas or a gas mixture can be introduced, or was already introduced. The first bottom of the casing of the cartridge system, which is made of at least one material that is partially or entirely permeable to the gas or the gas mixture, is preferably made of silicone or a material combination comprising silicone and/or a permeable material, such as PTFE or glass. The closing portion of the casing can, as was already described, likewise be made of a microporous glass permeable to gas. In this way, a gas or gas mixture can be supplied to the inner volume of the cartridge and/or be discharged therefrom directly or indirectly from beneath. In a further embodiment, the cartridge system comprises a sensor or sensing probe, which is able to measure the diffusion of the gas or of the gas mixture in a time-resolved manner so as to thereby control the volume flow of the gas or of portions of a gas mixture over the duration of the process. The sensor may already be present in the cartridge, such as in the support. For example, the sensor may be introduced during insertion of the cartridge system and, where necessary, be positioned by way of a locking or centering procedure of the cartridge through a special, previously sealed opening or by perforation of the cartridge. It is favorable when the position of the sensor is selected such that the sensor does not make contact with the photosensitive resin, or when the sensor is configured such that a contamination does not result in a distortion of the measurement and in increased measuring uncertainty. The measuring of the atmosphere within the cartridge may take place by way of direct or indirect methods. A particularly advantageous measuring method is one in which the sensor or sensing probe is arranged outside the cartridge or the casing, and enables a measurement of the composition or of the gas concentration within the cartridge; for this purpose, the permeability of the casing itself may be utilized, so as to be able to infer the gas concentration in specific areas.

In further embodiments of the invention, different gases or gas mixtures may be supplied within the cartridge. For example, oxygen may be supplied from beneath through the bottom of the cartridge in a higher concentration than in the normal atmosphere, and nitrogen may be supplied from above through the support, so as to deliberately influence the properties of the photosensitive resin or of the processing thereof, and ultimately the final properties of the body that is created.

A person skilled in the art will, of course, be able to readily make a variety of modifications and additions to the embodiments of the invention disclosed herein, to the extent these are within the scope of protection of the claims below.

The invention claimed is:

1. A stereolithography device (1) for producing a three-dimensional object (2) by way of layered or continuous curing of a photosensitive substance (3) under the action of specific radiation triggering the curing process, the device comprising:
   a support unit (7);
   a radiation source (8) for generating the radiation (80) triggering the curing process; and
   at least one cartridge unit (5, 6) which is configured to be positioned on the support unit and removed therefrom and which includes (1) an interior space surrounded by a casing (14), at least a portion of the casing being transparent to the radiation triggering the curing process, and (ii) a closure element which is configured to close the interior space during an irradiation and curing process,
   wherein the casing (14, 141, 142, 143, 144, 24, 34, 44) of the at least one cartridge unit (5, 6, 10, 20, 30, 40) is deformable, and the interior space (140, 240, 340, 440) surrounded by the casing has a volume that is at least partially formed by a receiving space (4) configured to receive, and make accessible to said radiation, a quantity of the photosensitive substance (3) for at least a duration of the irradiation and curing process.

2. The device according to claim 1, wherein the cartridge unit (5, 6) is configured to be fixed detachably to the support unit (7).

3. The device according to claim 1, wherein a deformable area of the casing has a one-piece design, and is made of a flexible material.

4. The device according to claim 1, wherein the volume of the interior space (140) is formed predominantly by the receiving space (4).

5. The device according to claim 1, wherein the interior space (140) surrounded by the casing has a volume that remains substantially the same during a deformation of the casing.

6. The device according to claim 1, wherein the casing is deformable in a way that permits a reversible compression with respect to a height of the cartridge unit.

7. The device according to claim 1, wherein the casing (14, 24, 34, 141, 142, 143, 144) has a geometric shape which is foldable onto itself and comprises at least one reference surface (41, 42).

8. The device according to claim 1, wherein the casing comprises a bottom, a top part, and a jacket connecting the bottom and the top part, wherein the jacket is deformable.

9. The device according to claim 8, wherein the bottom of the casing and/or the jacket comprise least one perforatable area for forming at least one opening for supplying or removing a photosensitive substance and/or for supplying or removing solvent into and/or out of the interior space.

10. The device according to claim 8, wherein the jacket and/or the bottom are configured to be permeable to oxygen, air, and other gases or gas mixtures (19).

11. The device according to claim 8, wherein the casing includes a closable opening on the upper face and/or on the side, through which the photosensitive substance can be supplied to the interior space and removed therefrom.

12. The device according to claim 11, wherein the casing comprises sealing elements for sealing the opening.

13. The device according to claim 11, wherein the closure element (11, 21, 100, 200, 300, 400, 500) has a one-piece design, wherein the closure element is realized as a support for the cured layers of the photosensitive substance.

14. The device according to claim 1, wherein the cartridge unit comprises a component that is movable in the interior space and guided in the cartridge unit by way of guides of a geometric, mechanical and/or magnetic nature.

15. The device according to claim 1, wherein the closure element (100, 200, 300, 400, 500, 11, 21) upwardly delimits and closes the interior space, wherein the closure element is replaceable and has an overall rigid design.

16. The device according to claim 15, wherein the closure element comprises geometric clearances formed in a surface facing the interior space.

17. The device according to claim 15 wherein the closure element has a multi-piece design and comprises at least one area (101) configured to store one or more photosensitive substances.

18. The device according to claim 17, wherein the area is configured to accept a receptacle (101, 312, 401, 404) comprising a photosensitive substance, the device further comprising elements (105, 305) for perforating the receptacle.

19. The device according to claim 15, wherein the closure element comprises at least one integrated plunger (301), the plunger having a stroke enabling the delivery of the photosensitive substance to be metered.

20. The device according to claim 19, wherein the plunger (301) comprises units (305) for perforating or opening a receptacle (312) present in the closure element, and wherein the receptacle comprises a photosensitive substance.

21. The device according to claim 19, wherein the plunger comprises units for supplying a solvent and/or nitrogen, air, or another gas or gas mixture.

22. The device according to claim 1, wherein the cartridge unit comprises an oxygen-permeable bottom that has at least a one-piece design.

23. The device according to claim 1, further comprising a unit for generating vibrations, which facilitate a detachment of the produced three-dimensional object.

24. The device according to claim 1, wherein a plurality of cartridge units (5, 6) can be inserted into the device.

\* \* \* \* \*